(12) United States Patent  
Aoki et al.

(10) Patent No.: US 7,717,217 B2  
(45) Date of Patent: May 18, 2010

(54) DEVICE FOR DERIVING INFORMATION ABOUT DISPLACEMENT OF A VEHICLE COMPONENT

(75) Inventors: Hiroshi Aoki, Tokyo (JP); Kazuya Ooi, Tokyo (JP)

(73) Assignee: Takata Corporation, Tokyo (JP)

( * ) Notice: Subject to any disclaimer, the term of this patent is extended or adjusted under 35 U.S.C. 154(b) by 349 days.

(21) Appl. No.: 11/826,638

(22) Filed: Jul. 17, 2007

(65) Prior Publication Data

US 2008/0029329 A1  Feb. 7, 2008

(30) Foreign Application Priority Data

Aug. 2, 2006  (JP) ............... 2006-211331

(51) Int. Cl.  
*B60R 21/0136* (2006.01)  
*B60R 21/16* (2006.01)

(52) U.S. Cl. ............ 180/274; 280/735; 340/436

(58) Field of Classification Search .......... 180/274, 180/271; 280/735; 340/436  
See application file for complete search history.

(56) References Cited

U.S. PATENT DOCUMENTS

| 5,281,780 | A |   | 1/1994  | Haland |
|-----------|---|---|---------|--------|
| 5,335,749 | A |   | 8/1994  | Taguchi et al. |
| 5,580,084 | A | * | 12/1996 | Gioutsos ............... 280/735 |
| 5,767,766 | A | * | 6/1998  | Kwun .................. 340/436 |
| 6,693,549 | B2 |  | 2/2004  | Stuetzler |
| 6,777,927 | B1 |  | 8/2004  | Bomya |
| 7,164,349 | B2 | * | 1/2007 | Kawaura et al. ........... 340/435 |
| 7,209,844 | B2 |   | 4/2007 | Merrick |
| 7,212,895 | B2 |   | 5/2007 | Cech |
| 7,388,370 | B2 |   | 6/2008 | Cech |
| 7,514,917 | B2 | * | 4/2009 | Cech et al. ................. 324/228 |
| 7,564,249 | B2 | * | 7/2009 | Bauer et al. ................ 324/713 |
| 7,570,068 | B2 | * | 8/2009 | Bauer et al. ................ 340/436 |
| 2004/0056652 | A1 | * | 3/2004 | Bomya ................ 324/207.17 |
| 2005/0154530 | A1 | * | 7/2005 | Hosokawa et al. ......... 701/301 |
| 2008/0029329 | A1 |   | 2/2008 | Aoki |
| 2008/0068008 | A1 |   | 3/2008 | Watson |
| 2008/0109177 | A1 |   | 5/2008 | Cech |
| 2008/0109190 | A1 |   | 5/2008 | Bauer |
| 2008/0211646 | A1 | * | 9/2008 | Cech et al. ................. 340/436 |
| 2009/0167300 | A1 |   | 7/2009 | Cech |

FOREIGN PATENT DOCUMENTS

| EP | 1 747 946 A1 | 1/2007 |
| JP | 5-45372 | 2/1993 |
| JP | 5-93735 | 4/1993 |
| WO | WO 2005/028254 A2 | 3/2005 |
| WO | WO 2006/005766 A1 | 1/2006 |
| WO | WO 2007/114870 A2 | 10/2007 |

OTHER PUBLICATIONS

U.S. Appl. No. 12/483,236, filed Jun. 11, 2009, TK Holdings Inc.

* cited by examiner

*Primary Examiner*—Paul N Dickson  
*Assistant Examiner*—Drew Brown  
(74) *Attorney, Agent, or Firm*—Foley & Lardner LLP

(57) ABSTRACT

A collision detecting device which is installed in a vehicle comprises a metallic object to be detected having an extending surface which can be displaced toward a coil sensor according a vehicle collision and is arranged to face the sensor surface of the coil sensor.

2 Claims, 15 Drawing Sheets

DEVICE FOR DERIVING INFORMATION ABOUT DISPLACEMENT OF A VEHICLE COMPONENT

BACKGROUND

The present invention relates to a technology for deriving information about displacement of a vehicle component.

Conventionally, there are known various vehicle collision sensors for detecting occurrence of a collision in the event of a vehicle accident. For example, disclosed in Japanese patent document no. JP-A-05-45372 as listed below is an arrangement of employing a structure of cancelling insulation between two electric conductors so as to establish electric continuity therebetween when a vehicle side door is subjected to an impact exceeding a certain value in the event of a vehicle lateral collision, thus sensing occurrence of a collision on the vehicle side door as an electric signal.

By the way, in a structure for restraining a vehicle occupant in the event of a vehicle collision by an occupant restraint system such as an airbag, there is a high demand for technology for improving the occupant restraining capability. For this, it is highly requested to develop an effective sensor for improving detection capability in order to rapidly and securely detect occurrence of a vehicle collision.

The present invention is made in view of the aforementioned point and it is an object of the present invention to provide a technology, relating to detection of information about displacement of a vehicle component during a vehicle collision, which is effective for improving the detection characteristics.

SUMMARY

Though the present invention is typically adapted to a technology for deriving information about displacement of a vehicle component in an automobile, the present invention can be also adapted to a technology for deriving information about displacement of a vehicle component in a vehicle other than the automobile. The vehicle used here may include various vehicles such as an automobile, airplane, a boat, a train, a bus, and a truck, The first disclosed embodiment is directed to a device for detecting information about an object to be detected which is displaced by a vehicle collision and comprises at least an object to be detected, a coil, a coil sensor, and a deriving unit. The vehicle collision may widely include a lateral collision, a frontal collision, a rear collision, a rollover, and the like.

The object to be detected may include, for example, a metallic member structured as a vehicle component of which all or a part is a conductive member or a magnetic member containing, for example, steel, copper, aluminum, and/or ferrite. The coil may be arranged to face the object to be detected. The object to be detected may be provided exclusively for the coil or may be an existing vehicle component.

The coil sensor applies an AC magnetic field to the object to be detected when the coil is energized with alternative current and has a function of detecting impedance (i.e., an AC impedance) when energized. That is, the coil sensor is structured as a coil sensor having two functional sections: i.e. an exciting section for applying an AC magnetic field to the object to be detected when the coil is energized with alternative current and a detecting section for detecting impedance through the coil when energized. Therefore, the coil itself substantially composes a coil sensor having the exciting section and the detecting section.

Specifically, when the coil is energized with alternative current and an AC magnetic field is applied to the object to be detected near the coil, an eddy current is produced on the object to be detected by the law of electromagnetic induction. The eddy current still produces a magnetic field and a part of the magnetic field intersects with the coil. As a result, the magnetic field by the eddy current flowing through the object to be detected is added to the magnetic field by the current supplied from an AC power source. By these magnetic fields, an induced voltage is produced in the coil. The ratio of the voltage generated in the coil relative to the current flowing through the coil is represented as AC impedance of the coil. As a result, the AC impedance is varied by bringing the object to be detected close to the coil. The variation in AC impedance is detected by continuously or periodically detecting the AC impedance of the coil through the coil.

The deriving unit may have a function of deriving information about displacement of the object to be detected based on variations in impedance detected when the object to be detected is displaced toward the coil sensor in the event of a vehicle collision. Therefore, information about displacement of the object to be detected during the vehicle collision is derived by the deriving unit. Specifically, the deriving unit has a storing function and a computing function. Therefore, the deriving unit previously store relations between the variations in AC impedance and the displacement of the object to be detected and conducts computation of comparing the variations in AC impedance, actually detected through the coil sensor, to the stored relations, thereby deriving information about displacement of the object to be detected. The information about displacement of the object to be detected used here may be displacement distance, displacement speed, displacement acceleration, or the like. Further, when the motion of a displacing member which is displaced by a vehicle collision correlates with the motion of the object to be detected, information about the displacing member can be derived using information about displacement of the object to be detected.

The aforementioned object to be detected is adapted to be displaced toward the coil sensor according to the displacement of a vehicle component by a vehicle collision and has an extending surface arranged to face the sensor surface of the coil sensor. As the extending surface of the object to be detected, a flat surface, a stepped surface, a curved surface, and the like may be suitably used. Examples of the vehicle component which is displaced by a vehicle collision include an outer panel (door panel (door skin), front panel, rear panel, hood panel, trunk panel and so on) forming the outer shell of the vehicle. In this invention, the object to be detected may be formed separately from the vehicle component which is displaced by a vehicle collision, may be formed integrally with the vehicle component, or may be the vehicle component itself.

When the vehicle component such as a door outer panel or a door beam is directly detected by the coil sensor, the detection characteristics of the coil sensor are different according to the surface profile of the vehicle component. Accordingly, it is required to change the detection characteristics according to the installation location of the coil sensor. That is, this arrangement has a limitation in improving the detection characteristics and improving the versatility. An object to be detected which is displaced by a vehicle collision is provided exclusively for the coil sensor, an extending surface to be arranged to face the coil surface is provided on the object to be detected, and the extending surface is detected directly by the coil sensor.

By employing this arrangement, detection characteristics in which variations in AC impedance relative to the distance between the metallic object to be detected and the coil sensor are substantially constant can be obtained regardless of the installation location of the coil sensor, thereby improving the detection characteristics of information about displacement of the object to be detected.

The information about displacement of the object to be detected, derived by the deriving unit, may be suitably used for controlling an occupant restraint device such as an airbag device and a seat belt device which is activated to restrain a vehicle occupant in the event of a vehicle collision, for controlling a warning device for outputting warning such as display and sound for informing of the vehicle collision, and for controlling another object to be controlled. Typically, such an arrangement may be employed that a control signal is outputted to an airbag device and/or a seat belt device when it is determined that a vehicle collision actually occurs based on the information about displacement of the object to be detected.

The second disclosed embodiment is directed to a displacement information deriving device having the structure of the first embodiment, wherein the object to be detected is fixed to the vehicle component and is adapted to be displaced integrally with the vehicle component toward the coil sensor in the event of the vehicle collision.

According to this arrangement, the object to be detected by the coil sensor is fixed to the vehicle component and the detection characteristics of information about displacement of the object to be detected can be improved.

In the third disclosed embodiment, the object to be detected is fixed to the coil sensor via an elastic body which is elastically deformable between the vehicle component and the coil sensor. Further, the object to be detected is pressed by the vehicle component according to the displacement of the vehicle component toward the coil sensor to move closer to the coil against the elastic force of the elastic body during the vehicle collision. The elastic body is preferably formed from an elastic material such as sponge or urethane.

According to this arrangement, the object to be detected by the coil sensor is fixed to the coil sensor and the detection characteristics of information about displacement of the object to be detected can be improved.

In the fourth disclosed embodiment, the elastic body is elastically deformed maintaining the parallel relation between the extending surface of the object to be detected and the sensor surface of the coil sensor when the object to be detected is moved closer to the coil sensor.

According to this arrangement, the variation in AC impedance relative to the distance between the object to be detected and the coil sensor is unambiguously defined, thereby improving the detection characteristics of information about displacement of the object to be detected.

In the fifth disclosed embodiment, an occupant restraint system is provided that also includes a displacement information deriving device as disclosed in the first through fourth embodiments, and a control device.

The occupant restraint device is a device for restraining a vehicle occupant during a vehicle collision. The occupant restraint device may include, for example, occupant restraint devices such as an airbag device (airbag module) and a seat belt device.

The control device may be structured as a device at least having a function of controlling the occupant restraint device according to the information derived by the deriving unit, i.e. the information about displacement of the object to be detected. Typically, such an arrangement may be employed that a control signal is outputted to an airbag device and/or a seat belt device when it is determined that a vehicle collision actually occurs according to the information about displacement of the object to be detected. Alternatively, such an arrangement may be employed that the impact energy at occurrence of collision is estimated based on the information about displacement of the object to be detected and the occupant restraint mode in the airbag device and/or the seat belt device is changed according to the estimated impact energy. The control device may be exclusively used for controlling the occupant restraint device or may be used also for controlling the actuation of an engine/running system and an electrical system.

According to this arrangement, the occupant restraint device is controlled using highly precise information about displacement of the object to be detected obtained by the displacement information deriving device, thereby ensuring complete restraint of the vehicle occupant.

In the occupant restraint system, the coil of the displacement information deriving device may be arranged to face a door outer panel of a vehicle door as the vehicle component. The occupant restraint device may be adapted to be controlled by the control device to restrain the vehicle occupant in the event of a lateral vehicle collision. In this case, when an airbag device is used as the occupant restraint device, an airbag device of which airbag is accommodated in a seat, a pillar, or an upper roof rail may be employed. According to this arrangement, complete restraint of the vehicle occupant in the event of a vehicle lateral collision is ensured.

The seventh disclosed embodiment is a vehicle comprising an engine/running system; an electrical system; an actuation control device, an object to be detected, a sensor device, and a control signal output device.

The engine/running system is a system involving an engine and a running mechanism of the vehicle. The electrical system is a system involving electrical parts used in the vehicle. The actuation control device is a device having a function of conducting the actuation control of the engine/running system and the electrical system. The object to be detected is a metallic member which is displaced by a vehicle collision. The object to be detected is a metallic member of which all or a part is a conductive member or a magnetic member containing, for example, steel, copper, aluminum, and/or ferrite. The sensor device is structured as a device having a function of deriving information about displacement of the object to be detected.

In this embodiment, the sensor device may include a displacement information deriving device as described above. The control signal output device is structured as a device having a function of outputting a control signal to the object to be controlled according to the information derived by the sensor device. The object to be controlled may include, for example, an occupant restraint device such as an airbag device and a seat belt device which is activated to restrain a vehicle occupant in the event of a vehicle collision and a warning device for outputting warning such as display and sound for informing of the vehicle collision. The control signal output device may be exclusively used for control of the object to be controlled or may be used also as an actuation control device for controlling the actuation of an engine/running system and an electrical system.

This arrangement can provide a vehicle in which highly precise information about displacement of the object to be detected obtained by the displacement information deriving device is used for controlling a variety of objects to be controlled about the vehicle.

In an embodiment directed to a displacement information deriving method, a coil sensor is used which is arranged to face a metallic object to be detected. The object to be detected is structured as a vehicle component, can be displaced toward the coil sensor according to a vehicle collision, and has an extending surface arranged to face the sensor surface of the coil sensor. Then, the coil of the coil sensor is energized to apply an AC magnetic field to the object to be detected, impedance when energized is detected by the coil, and variation in impedance when the object to be detected is displaced toward the coil sensor during a vehicle collision is detected through the coil. Therefore, detection characteristics about variation in impedance relative to the distance between the object to be detected and the coil sensor are obtained and information about displacement of the object to be detected is derived according to the detection characteristics. For conducting this method, the displacement information deriving device described herein can be substantially used.

Therefore, this method enables improvement of detection characteristics of information about displacement of the object to be detected during a vehicle collision.

As described in the above, the disclosed embodiments relate to the structure of a coil sensor, which has a coil arranged to face a metallic object to be detected and applies an AC magnetic field to the object to be detected when the coil is energized with alternative current and detects impedance when energized, and employs an arrangement in which an extending surface arranged to face the sensor surface of the coil sensor is provided on the object to be detected, thereby enabling improvement of detection characteristics of information about displacement of the object to be detected.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages will become apparent from the following description, appended claims, and the accompanying exemplary embodiments shown in the drawings, which are briefly described below.

DESCRIPTION

Hereinafter, description will be made as regard to an occupant restraint system 100 as an embodiment of occupant restraint system with reference to FIG. 1 through FIG. 9. This embodiment employs an airbag module with a deployable airbag as the occupant restraint system implementing occupant restraint. Though the airbag module used for a vehicle occupant (driver) on a vehicle seat on a right side in a vehicle cabin is described in this embodiment, the airbag module of this embodiment may be adapted to an airbag module for an occupant on any vehicle seat such as a driver's seat, a front passenger seat, and a rear seat.

Figure 1:
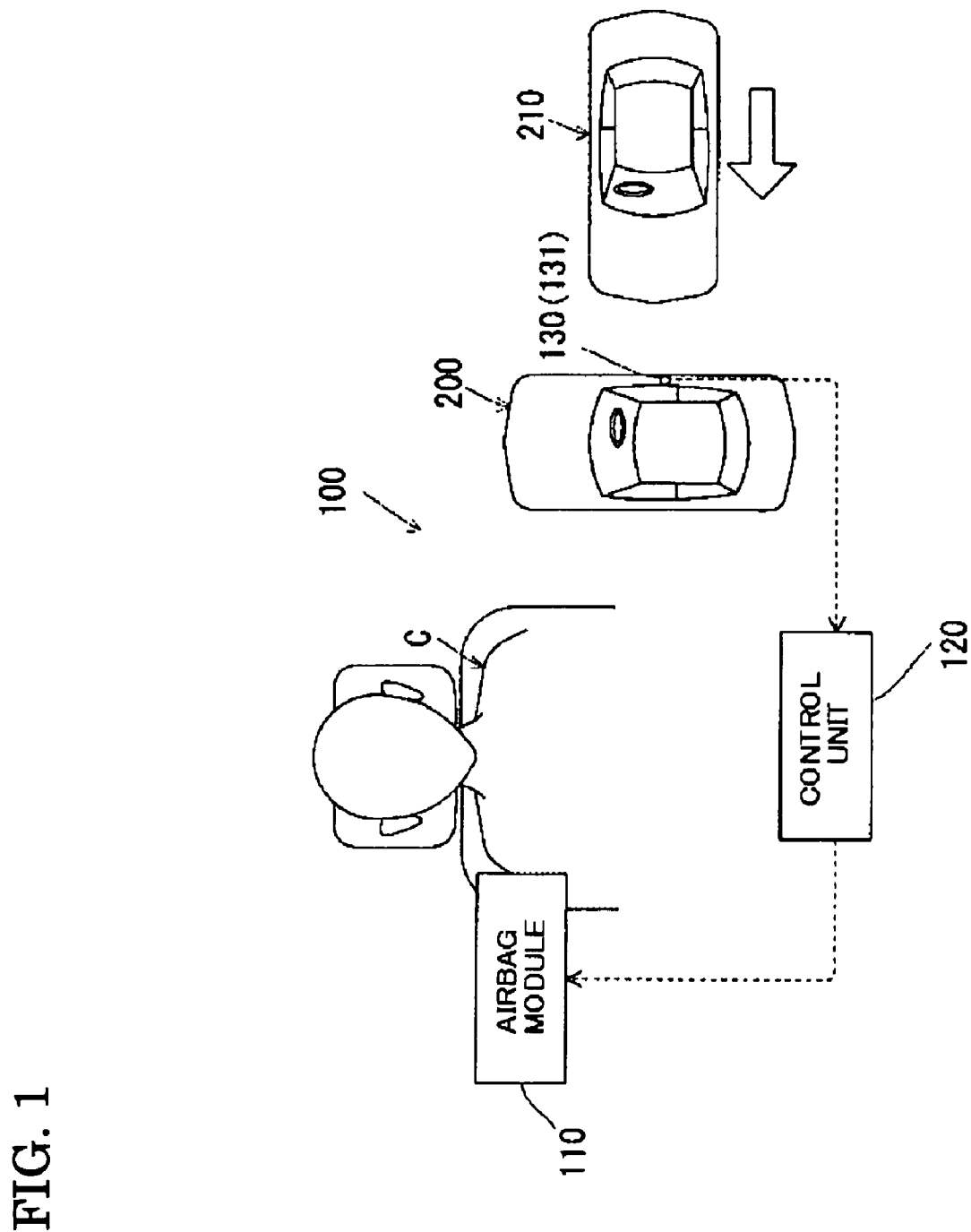
FIG. 1 is an illustration schematically showing an occupant restraint system installed in a vehicle.

The configuration of an occupant restraint system 100 of this embodiment, which is installed in a subject vehicle 200, of this embodiment is schematically shown in FIG. 1. As will be described in detail later, a collision detecting device 130 composing the occupant restraint system 100 is installed in a vehicle door which is opened and closed for allowing a vehicle occupant C to get in or out the vehicle in this embodiment. Besides the collision detecting device 130 of the occupant restraint system 100, another detecting device and/or another occupant restraint system may be installed in a vehicle-side member such as a trim or a pillar.

As shown in FIG. 1, the subject vehicle 200 comprises a number of vehicle components composing the vehicle, an engine/running system involving an engine and a running mechanism of the vehicle, an electrical system involving electrical parts used in the vehicle, and an actuation control means for conducting the actuation control of the engine/running system and the electrical system. Particularly in this embodiment, the occupant restraint system 100 is installed in the subject vehicle 200.

The occupant restraint system 100 is an apparatus having a function of protecting the vehicle occupant C on the vehicle seat in the event of a vehicle accident such as a lateral collision (for example, a collision with another vehicle 210 from a lateral side) or a rollover of the subject vehicle 200. The occupant restraint system 100 comprises at least: an airbag module 110, a control unit (ECU) 120, and the collision detecting device 130.

The airbag module 110 comprises at least an airbag and a gas generator, but not shown. The airbag is expandable and is adapted to be deployed into an occupant restraint area with gas supplied from the gas generator when a vehicle accident occurs. The airbag module 110 may correspond to the occupant restraint apparatus and/or the object to be controlled.

The control unit 120 is composed of a CPU (central processing unit), an input/output unit, a storage unit, a driving unit, a peripheral unit, and the like, but not shown. In this embodiment, the control unit 120 is electrically connected to the airbag module 110 to conduct transmission of detection signals and control signals therebetween. Especially, an input signal to be inputted into the control unit 120 is detection information (detection signal) detected by the collision detecting device 130. The control unit 120 outputs a control signal to the airbag module 110 based on the input signal from the collision detecting device 130. The control unit 120 may correspond to the control device and/or control signal output device.

The control unit 120 may be used exclusively for the control of the occupant restraint system 100 or may be used also for the control of another vehicle component and/or the control of the entire vehicle besides the control of the occupant restraint system 100.

Figure 2:
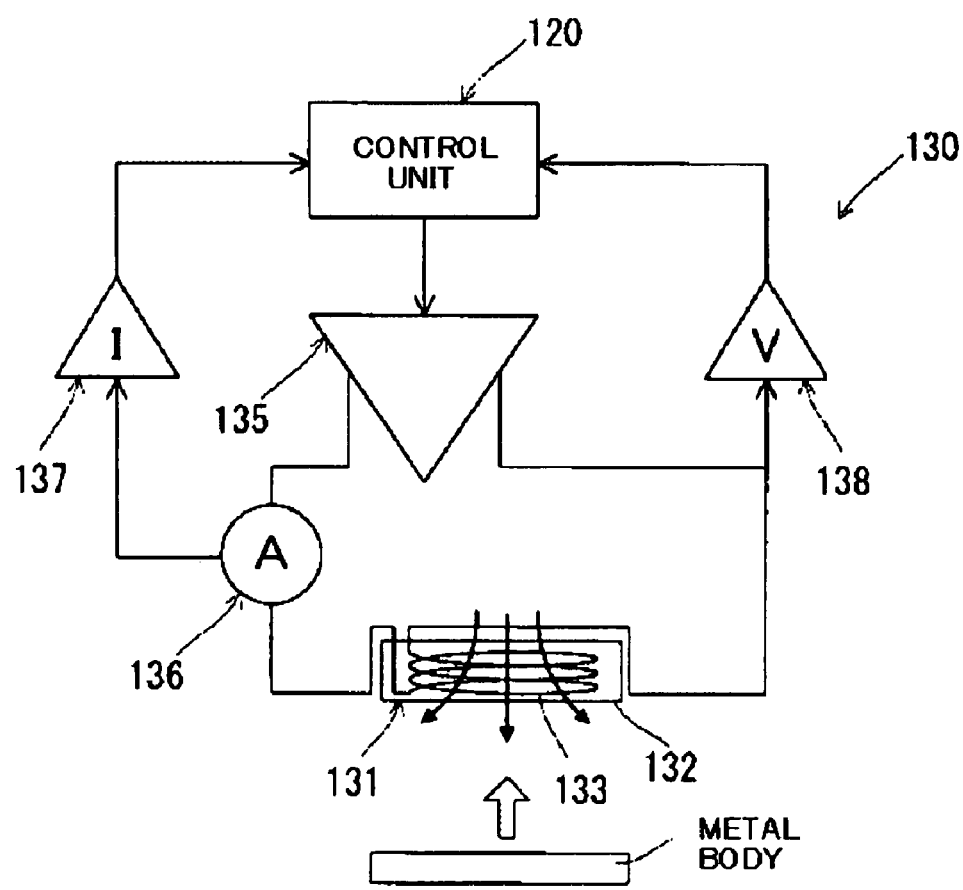
FIG. 2 is an illustration showing a driving circuit of a collision detecting device.

Here, a driving circuit of the collision detecting device 130 in FIG. 1 is shown in FIG. 2.

As shown in FIG. 2, the collision detecting device 130 comprises at least: a coil sensor 131, an AC power source unit 135, an ammeter 136, a current output unit 137, a voltage output unit 138, a holding member 134 and a metal plate 139 as will be described later. The coil sensor 131 comprises a coil 133 which is formed by winding a wire into a circle several times and which is accommodated in a sensor housing 132. The AC power source unit 135 is a unit for supplying alternative current to the coil 133 of the coil sensor 131 according to the control signal from the control unit 120. The ammeter 136 has a function of detecting current flowing through the coil 133. The current output unit 137 has a function of detecting information about variation in current (phase and amplitude) flowing through the coil 133 and the voltage output unit 138 has a function of detecting information about variation in voltage (phase and amplitude) in the coil 133.

The collision detecting device 130 may correspond to the displacement information deriving device and/or the sensor device.

In the collision detecting device 130 having the aforementioned structure, when the coil 133 is energized with alternative current by the activation of the AC power source unit 135 and an AC magnetic field is applied to a metal body (conductive body or magnetic body) near the coil 133, an eddy current is produced on the metal body by the law of electromagnetic induction. The eddy current still produces a magnetic field and a part of the magnetic field intersects with the coil 133. As a result, the magnetic flux by the eddy current flowing through the metal body is added to the magnetic flux by the current supplied from the AC power source unit 135. By these magnetic fluxes, an induced voltage is produced in the coil 133. The ratio of the voltage produced in the coil relative to the current flowing through the coil 133 is represented as AC impedance of the coil 133. As a result, the AC impedance is varied by bringing the metal body close to the coil 133. The variation in AC impedance is detected by continuously or periodically detecting the AC impedance of the coil 133 through the coil 133. In this embodiment, therefore, the coil 133 itself substantially composes the coil sensor 131 having an exciting section and a detecting section so that the variation in AC impedance detected by the detecting section is detected through the current output unit 137 and the voltage output unit 138.

Figure 3:
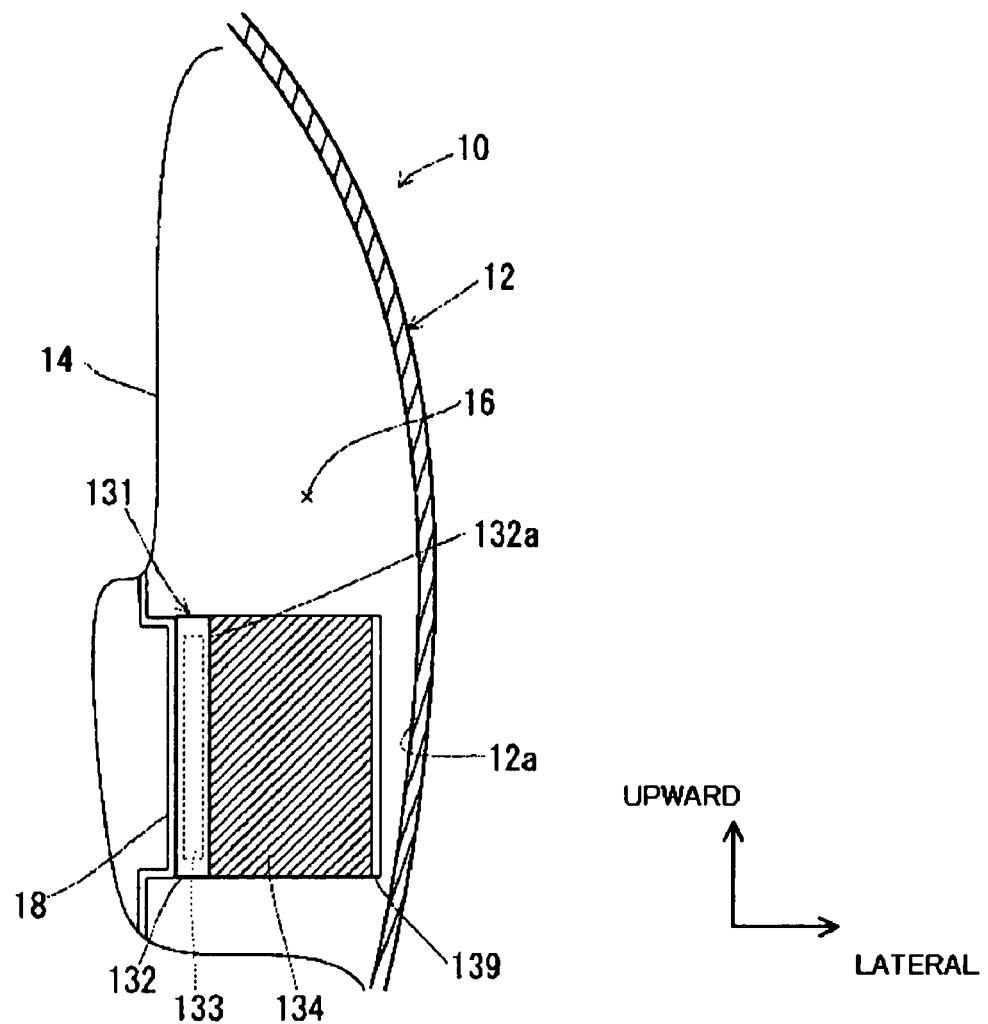
FIG. 3 is an illustration showing a structure in section of a vehicle door, illustrating a first embodiment of a coil sensor and the peripheral elements thereof.

A first embodiment of the coil sensor 131 of the collision detecting device 130 having the aforementioned structure and the peripheral elements thereof will be described with reference to FIG. 3. FIG. 3 is an illustration showing a structure of a vehicle door 10 in section, illustrating the first embodiment of the coil sensor 131 and the peripheral elements thereof.

As shown in FIG. 3, in the vehicle door 10 for allowing a vehicle occupant C to get in or get out the vehicle, the coil sensor 131 is disposed in a space 16 formed between a door outer panel (sometimes called door skin) 12 which is made of a metal sheet composing an outer wall of the vehicle and a door inner panel 14 composing an inner wall of the vehicle. Specifically, a bracket 18 is provided on a surface of the door inner panel 14 facing the space 16 and the coil sensor 131 is held by the bracket 18. Further, the metal plate 139 is held on a sensor surface 132a of the sensor housing 132 by the holding member 134. In the state shown in FIG. 3, the coil sensor 131 is arranged to face the metal plate 139 and the door outer panel 12 such that the coil extending surface or the coil plane (substantially the sensor surface 132a of the sensor housing 132) of the coil 133 is arranged to extend in parallel with the extending direction of the metal plate 139.

The holding member 134 is formed from an elastic material such as sponge or urethane. The holding member 134 may corresponds to the elastic body. The metal plate 139 is an object to be detected by the coil sensor 131 and is formed as a conductive member or a magnetic member containing, for example, steel, aluminum, and/or ferrite, similarly to the door outer panel 12. Since the aluminum has high conductivity so that large eddy current is produced by the coil sensor 131, the metal plate 139 is advantageously made of a metal containing aluminum because of improvement of detection sensitivity. The metal plate 139 and/or a metal plate 140 as will be described later may correspond to the metallic object to be detected.

Figure 4:
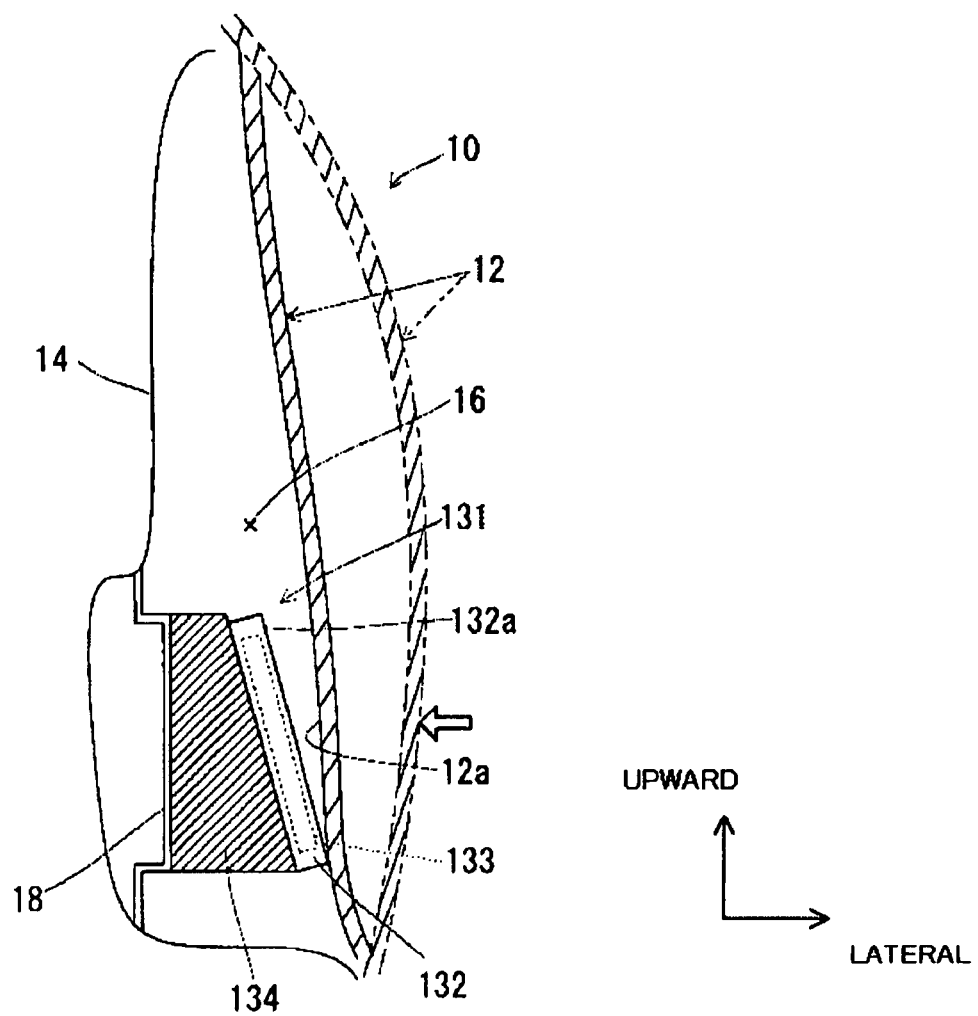
FIG. 4 is an illustration showing the structure in section of the vehicle door and the motion of the coil sensor when a door outer panel f a vehicle door is deformed by a lateral collision of the vehicle.

Hereinafter, the motion and function of the coil sensor 131 will be described with reference to FIG. 4 in addition to FIG. 3. FIG. 4 is an illustration showing the structure of the vehicle door 10 in section for explaining the motion of the coil sensor 131 during the door outer panel 12 of the vehicle door 10 is displaced by a lateral collision of the subject vehicle 200.

The following description will be made as regard to a case that the door outer panel 12 of the vehicle door 10 shown in FIG. 3 is subjected to an impact in a lateral direction (from the right side in FIG. 3) by a vehicle collision (a lateral collision of the subject vehicle 200 with another vehicle 210 as shown in FIG. 1) so that the door outer panel 12 is displaced (i.e., deformed or moved) toward the coil sensor 131. In this case, the door outer panel 12 shown in FIG. 3 comes to a state shown in FIG. 4, for example.

The state shown in FIG. 4 is that the door outer panel 12 is displaced from a position shown by two-dot chain lines to a position shown by solid lines so that a part of the door outer panel 12 facing the coil sensor 131 presses the metal plate 139 toward the inside of the vehicle (to the left in FIG. 4) so that the holding member 134 is flattened. In this state, the metal plate 139 as the object to be detected by the coil sensor 131 is arranged such that its flat extending surface (i.e., flat surface or confronting surface) extends in parallel with the extending surface of the coil (the sensor surface 132a). During the process from the state shown in FIG. 3 to the state shown in FIG. 4, the door outer panel 12 and the metal plate 139 are integrally displaced toward the coil sensor 131 (coil 133) side by the pressing force of the door outer panel 12, but not shown. During this, the metal plate 139 is displaced to flatten the holding member 134 and the parallel relation between the extending surface of the metal plate 139 and the extending surface of the coil is maintained. This action is obtained by suitably adjusting the entire hardness and partial hardness of the holding member 134 between the coil sensor 131 and the metal plate 139. When the door outer panel 12 presses the metal plate 139, the door outer panel 12 and the metal plate 139 are integrally displaced. To maintain the parallel relation between the extending surface of the metal plate 139 and the extending surface of the coil, another elastic member may be disposed on the metal plate 139 on the side of the door outer panel 12.

When the door outer panel 12 is displaced from the state shown in FIG. 3 to the state shown in FIG. 4, variations in AC impedance are detected by the coil sensor 131 continuously or periodically and are processed by the control unit 120. Based on the information about variations in AC impedance, information about displacement of the metal plate 139 or the door outer panel 12 is derived.

Specifically, the control unit 120 previously stores relations between the variations in AC impedance and the displacement of the metal plate 139 and/or the door outer panel 12 and compares the detected variations in AC impedance to the stored relations, thereby deriving information about displacement of the metal plate 139 and/or the door outer panel 12. As the information about displacement, displacement distance, displacement speed, and displacement acceleration may be suitably used. Since the door outer panel 12 and the metal plate 139 are integrally displaced when the door outer panel 12 presses the metal plate 139, the information about displacement of the door outer panel 12 and the information about displacement of the metal plate 139 detected by the coil sensor 131 are substantially identical to each other. The control unit 120 (i.e., deriving unit) for deriving information about displacement of the metal plate 139.

Based on the derived information about displacement of the metal plate 139 and/or the door outer panel 12, information about a lateral collision of the subject vehicle 200 is derived. Based on the derived information about the lateral collision, the airbag module 110 is controlled. As the information about the lateral collision, information whether or not the lateral collision actually occurred, and information about impact energy at the lateral collision may be suitably used. According to this control, the airbag of the airbag module 110 is inflated and deployed, whereby the airbag absorbs the impact energy acting on a side (the head, the neck, the shoulder, the chest, the abdomen, the knee, the lower limb) of the vehicle occupant (the vehicle occupant C in FIG. 1) and restrains the vehicle occupant.

For deriving information about the collision of the subject vehicle 200, information detected by another sensor may be used in addition to the information detected by the coil sensor 131. As the another sensor, for example, an acceleration sensor for detecting acceleration acting on the subject vehicle 200 in three directions (X-axial, Y-axial, Z axial directions) may be used.

It is known that, in case that a vehicle component such as the door outer panel 12 and a cylindrical or columnar door beam is directly detected by a coil sensor having a conventional structure, the detection characteristics of the coil sensor are different according to the surface profile. Accordingly, it is required to change the detection characteristics according to the installation location of the coil sensor. That is, the conventional one has a limitation in improving the detection characteristics and improving the versatility. Therefore, an arrangement is provided in which an object to be detected which is displaced by a vehicle collision is provided exclusively for the coil sensor, an extending surface to be arranged to face the coil surface is provided on the object to be detected, and the extending surface is detected directly by the coil sensor.

Therefore, by employing the first embodiment shown in FIG. 3, detection characteristics in which variations in AC impedance relative to the distance between the metal plate 139 as the object to be detected by the coil sensor 131 and the coil sensor 131 are substantially constant can be obtained regardless of the installation location of the coil sensor 131. Specifically, by maintaining the parallel relation between the plane-shaped extending surface of the metal plate 139 as the object to be detected by the coil sensor 131 and the extending surface of the coil, the variation in AC impedance relative to the distance between the metal plate 139 and the coil sensor 131 is unambiguously defined. Therefore, it is possible to improve the detection characteristics of information about displacement of the metal plate 139 and/or the door outer panel 12.

Instead of the first embodiment of the coil sensor 131 and the peripheral elements thereof shown in FIG. 3, other embodiments shown in FIG. 5 through FIG. 9 may be employed. In a second embodiment shown in FIG. 5 and a third embodiment shown in FIG. 6, a metal plate 135 is held on the side of the coil sensor 131 similarly to the first embodiment shown in FIG. 3. On the other hand, a fourth embodiment shown in FIG. 7, a fifth embodiment shown in FIG. 8, and a sixth embodiment shown in FIG. 9, the metal plate 135 is held on the side of the door outer panel 12.

In FIG. 5 through FIG. 9, the same elements as those shown in FIG. 3 are marked with the same reference numerals so that the detailed description about the elements will be omitted.

Figure 5:
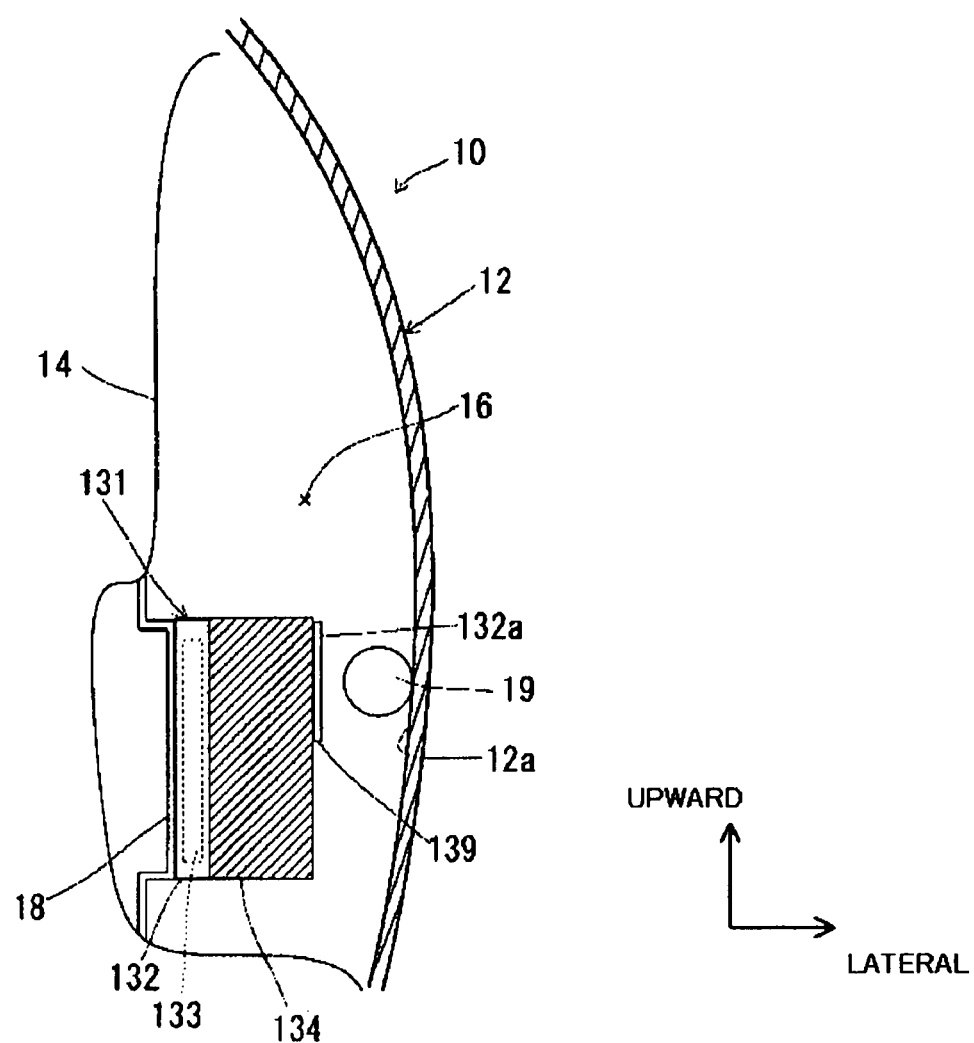
FIG. 5 is an illustration showing a structure in section of the vehicle door in the embodiment, illustrating a second embodiment of a coil sensor and the peripheral elements thereof.

The second embodiment of the coil sensor 131 and the peripheral elements thereof shown in FIG. 5 has a structure that a cylindrical or columnar door beam (i.e., reinforcing beam) 19 is fixed to an inner surface 12a of the door outer panel 12. The metal plate 139 is held by the sensor surface 132a of the sensor housing 132 through the holding member 134 and is fixed to a position of the holding member 134 to face the door beam 19.

In the second embodiment shown in FIG. 5, when the subject vehicle 200 is subjected to a lateral collision, the door beam 19 presses the metal plate 139 by pressing force from the door outer panel 12 and, in turn, the metal plate 139 is displaced to flatten the holding member 134. During the process of this displacement, the parallel relation between the extending surface of the metal plate 139 and the extending surface of the coil is maintained by the effect of the holding member 134.

Also by employing the second embodiment shown in FIG. 5, similarly to the first embodiment shown in FIG. 3, detection characteristics in which variations in AC impedance relative to the distance between the metal plate 139 and the coil sensor 131 are substantially constant can be obtained. The variation in AC impedance detected by continuously or periodically through the coil sensor 131 is processed by the control unit 120. Based on the information of variations in AC impedance, information about displacement of the metal plate 139, the door beam 19, and/or the door outer panel 12 can be derived. In this case, the control unit 120 previously stores relations between the variations in AC impedance and the displacement of the metal plate 139, the door beam 19, and/or the door outer panel 12 and compares the detected variations in AC impedance to the stored relations, thereby deriving information about displacement of the metal plate 139, the door beam 19, and/or the door outer panel 12. Since the door outer panel 12, the door beam 19, and the metal plate 139 are integrally displaced when the door outer panel 12 presses the metal plate 139 via the door beam 19, the information about displacement of the door outer panel 12, the information about displacement of the door beam 19, and the information about displacement of the metal plate 139 detected by the coil sensor 131 are substantially identical to each other.

The third embodiment of the coil sensor 131 and the peripheral elements thereof shown in FIG. 6 has a structure including another similar metal plate 140 which is arranged below the metal plate 139 fixed to a position of the holding member 134 facing the door beam 19. In addition, a buffer member 141 which is made of the same or similar material as that of the holding member 134 is fixed to the metal plate 140 on the side of the door outer panel 12.

Figure 6:
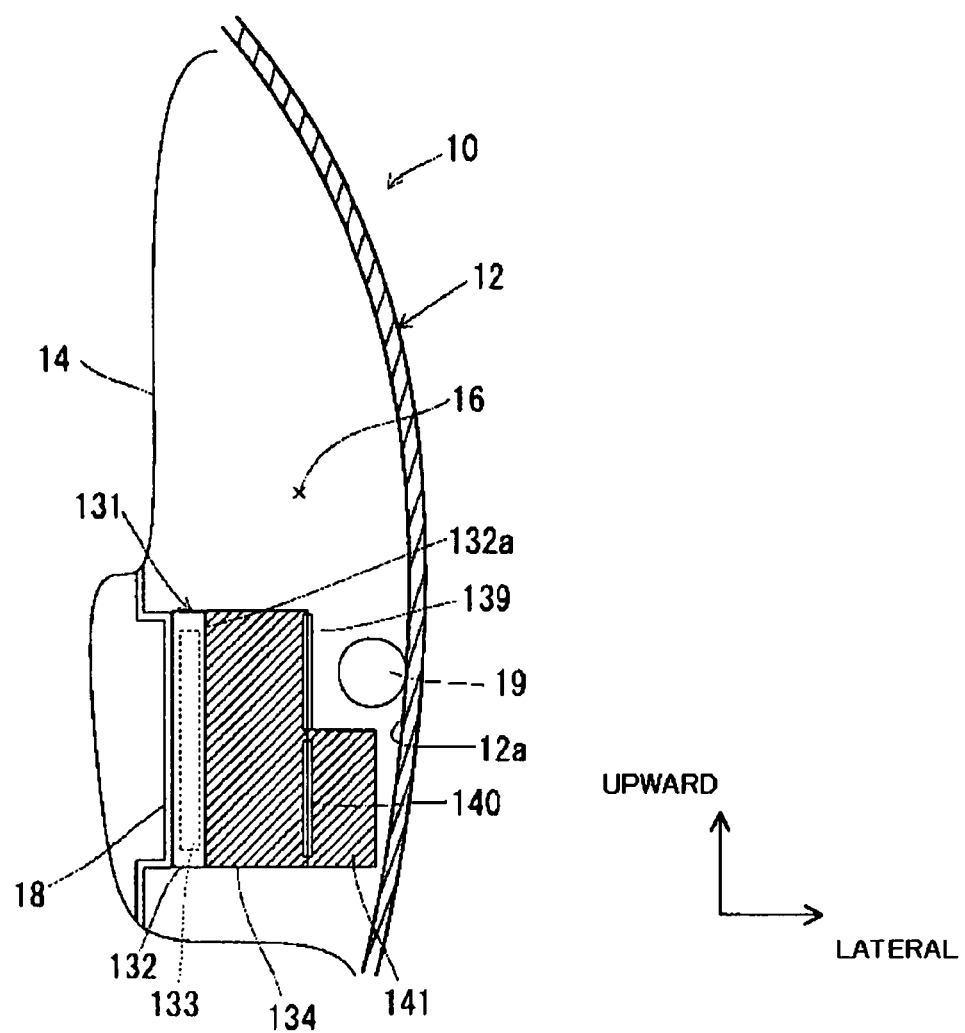
FIG. 6 is an illustration showing a structure in section of the vehicle door in the embodiment, illustrating a third embodiment of a coil sensor and the peripheral elements thereof.

In the third embodiment shown in FIG. 6, when the subject vehicle 200 is subjected to a lateral collision, the door beam 19 presses the metal plate 139 by pressing force from the door outer panel 12 and, in turn, the metal plate 139 is displaced to flatten the holding member 134. During the process of this displacement, the parallel relation between the extending surface of the metal plate 139 as the object to be detected by the coil sensor 131 and the extending surface of the coil is maintained by the effect of the holding member 134. At the same time, the pressing force of the door outer panel 12 also acts on the metal plate 140 after being buffered by the buffer member 141 so that the metal plate 140 is displaced to flatten the holding member 134. During the process of this displacement, the parallel relation between the flat extending surface of the metal plate 140 as the object to be detected by the coil sensor 131 and the extending surface of the coil is maintained by the effect of the holding member 134.

Also by employing the third embodiment shown in FIG. 6, similarly to the second embodiment shown in FIG. 5, detection characteristics in which variations in AC impedance relative to the distance between the metal plates 139, 140 and the coil sensor 131 are substantially constant can be obtained. The variation in AC impedance detected by continuously or periodically through the coil sensor 131 is processed by the control unit 120. Based on the information of variations in AC impedance, information about displacement of the metal plates 139 and 140, the door beam 19, and/or the door outer panel 12 can be derived. In this case, the control unit 120 previously stores relations between the variations in AC impedance and the displacement of the metal plates 139 and 140, the door beam 19, and/or the door outer panel 12 and compares the detected variations in AC impedance to the stored relations, thereby deriving information about displacement of the metal plate 139 and 140, the door beam 19, and/or the door outer panel 12. Since the door outer panel 12, the door beam 19, and the metal plates 139 and 140 are integrally displaced when the door outer panel 12 presses the metal plates 139 and 140 via the door beam 19, the information about displacement of the door outer panel 12, the information about displacement of the door beam 19, and the information about displacement of the metal plates 139 and 140 detected by the coil sensor 131 are substantially identical to each other.

Figure 7:
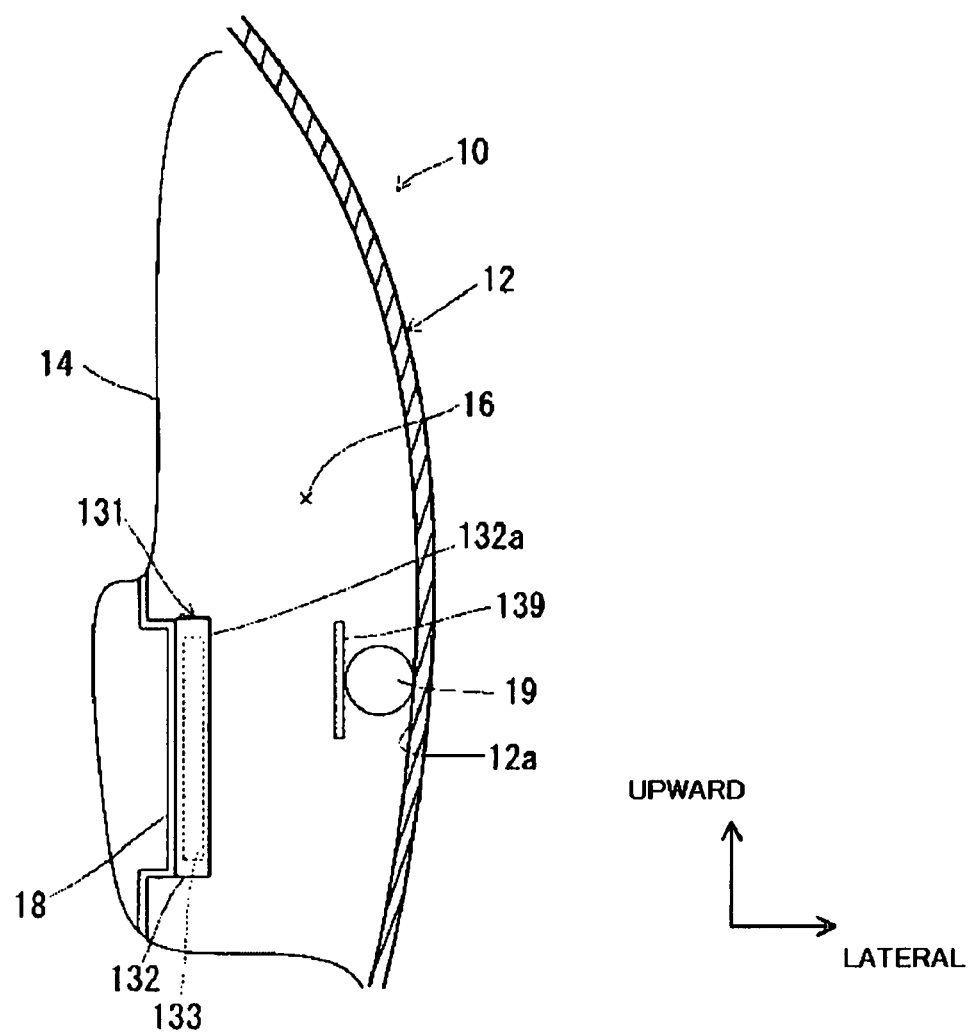
FIG. 7 is an illustration showing a structure in section of the vehicle door, illustrating a fourth embodiment of a coil sensor and the peripheral elements thereof.

The fourth embodiment of the coil sensor 131 and the peripheral elements thereof shown in FIG. 7 has a structure different from the structure of the second embodiment shown in FIG. 5 in that the holding member 134 is omitted and the metal plate 139 fixed to the side of the coil sensor 131 is fixed to the side of the door outer panel 12. In this structure, the door outer panel 12 and the metal plate 139 are integrally displaced toward the coil sensor 131 (the coil 133) by the pressing force from the door outer panel 12. Therefore, this structure can provide substantially the same work and effect as the second embodiment. In particular, since the holding member 134 is omitted, the simplification of the structure is achieved.

Figure 8:
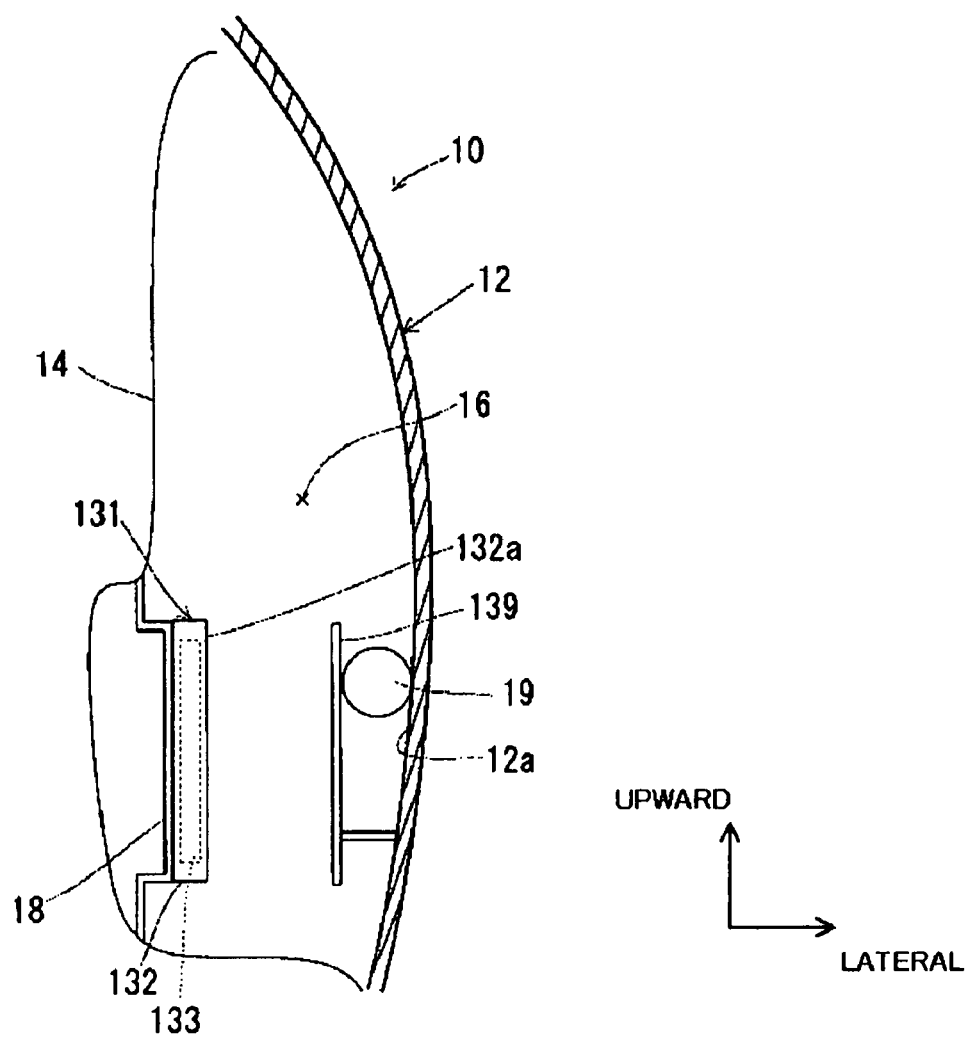
FIG. 8 is an illustration showing a structure in section of the vehicle door, illustrating a fifth embodiment of a coil sensor and the peripheral elements thereof.

The fifth embodiment of the coil sensor 131 and the peripheral elements thereof shown in FIG. 8 has a structure different from the structure of the third embodiment shown in FIG. 6 in that the holding member 134 is omitted and the metal plate 139 and the metal plate 140 fixed to the side of the coil sensor 131 are changed to a single metal plate 139 fixed to the side of the door outer panel 12. In this structure, the door outer panel 12 and the metal plate 139 are integrally displaced toward the coil sensor 131 (the coil 133) by the pressing force from the door outer panel 12. Therefore, this structure can provide substantially the same work and effect as the third embodiment. In particular, since the holding member 134 is omitted, the simplification of the structure is achieved.

Figure 9:
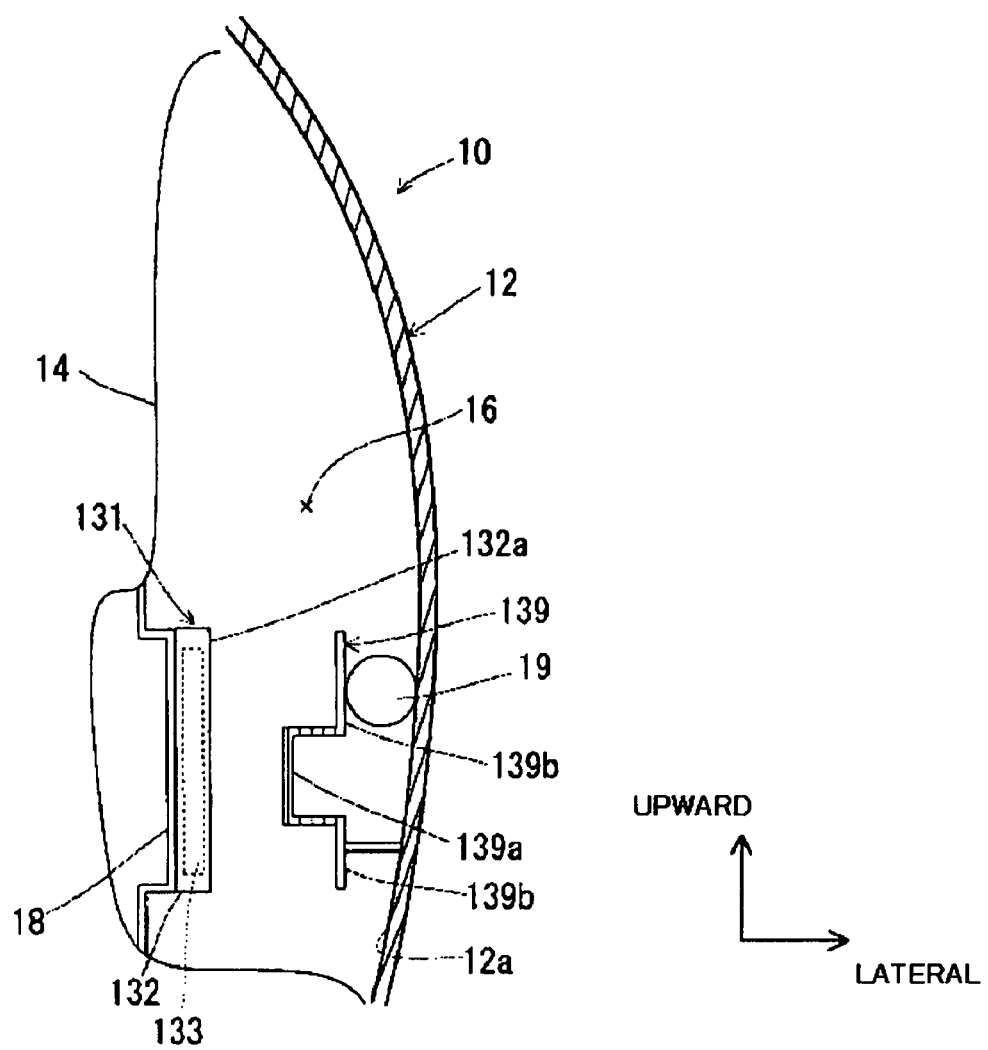
FIG. 9 is an illustration showing a structure in section of the vehicle door, illustrating a sixth embodiment of a coil sensor and the peripheral elements thereof.

The sixth embodiment of the coil sensor 131 and the peripheral elements thereof shown in FIG. 9 has a structure different from the structure of the fifth embodiment shown in FIG. 8 by designing the configuration of the extending surface of the metal plate 139. That is, the metal plate 139 has a first extending surface 139a and a second extending surface 139b which are formed into flat plates and the first extending surface 139a is arranged closer to the coil sensor 131 than the second extending surface 139b. In this structure, the door outer panel 12 and the metal plate 139 (the first extending surface 139a and the second extending surface 139b) are integrally displaced toward the coil sensor 131 (the coil 133) by the pressing force from the door outer panel 12. This structure can provide substantially the same work and effect as the fifth embodiment and still provide another effect that the detection characteristics which are linearized to have substantially constant variation in impedance relative to the distance between the metal plate 139 and the detecting sections are obtained.

As mentioned above, according to those embodiments, that are provided the collision detecting device 130 and the collision detecting method capable of improving the detection characteristics of information about displacement of the metal plate, 139, 140, the door beam 19, the outer panel 12. Specifically, detection characteristics in which variations in AC impedance relative to the distance between the metal plate 139, 140 and the coil sensor 131 are substantially constant can be obtained regardless of the installation location of the coil sensor 131 and the variation in AC impedance relative to the distance between the metal plate 139, 140 and the coil sensor 131 is unambiguously defined.

Further, according to these embodiments, the airbag module 110 is controlled using highly precise information about displacement of the metal plate 139, 140, the door beam 19, the door outer panel 12 obtained by the collision detecting device 130, thereby ensuring complete restraint of the vehicle occupant.

Further, according to this embodiment, a vehicle 200 in which highly precise information about displacement of the metal plate 139, 140, the door beam 19, the door outer panel 12 is used for controlling a variety of objects to be controlled about the vehicle.

The present invention is not limited to the aforementioned embodiments and various applications and modifications may be made. For example, the following respective embodiments based on the aforementioned embodiments may be carried out.

Though the aforementioned embodiments have been described with regard to a case that the metal plates 139, 140 to be detected by the coil sensor 131 are placed, the object to be detected having a flat plate-like extending surface may be formed by using an existing vehicle component. For example, such an arrangement that the inner surface 12a of the door outer panel 12 or a part of the door beam 19 are formed into a flat plate may be employed.

Figure 10:
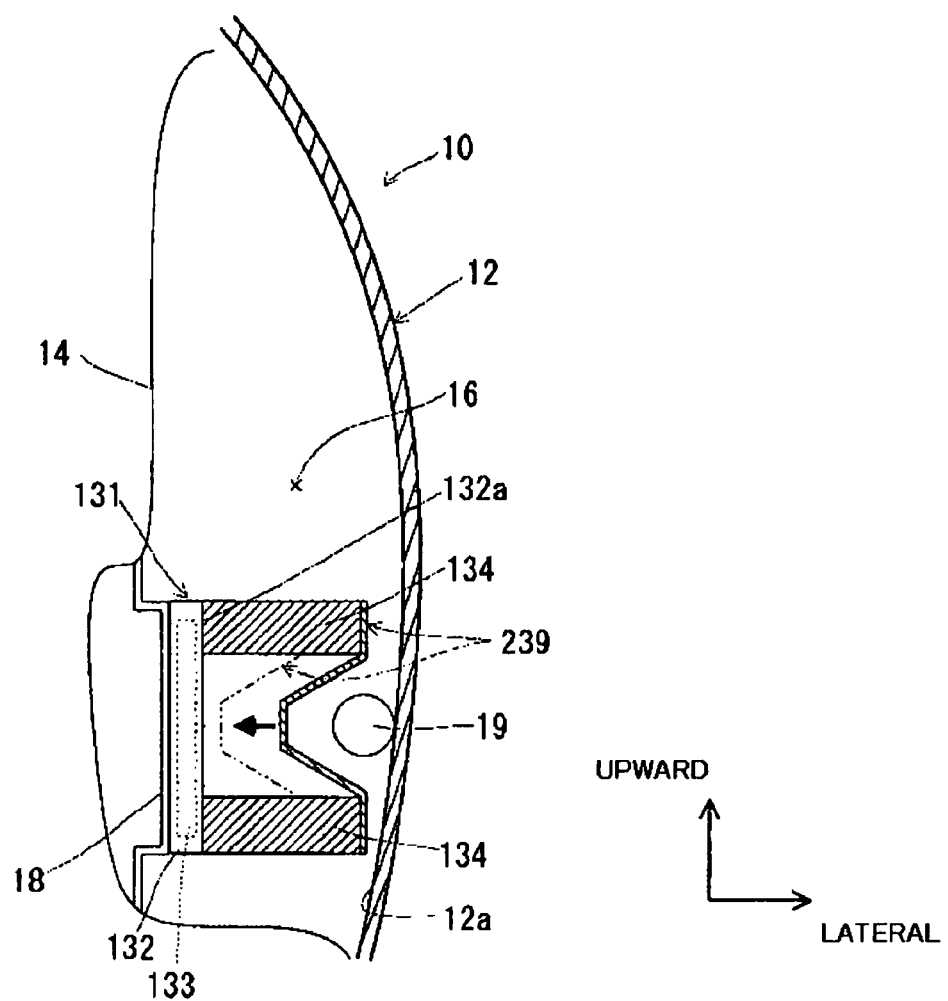
FIG. 10 is an illustration showing an arrangement using a metal plate.
Figure 11:
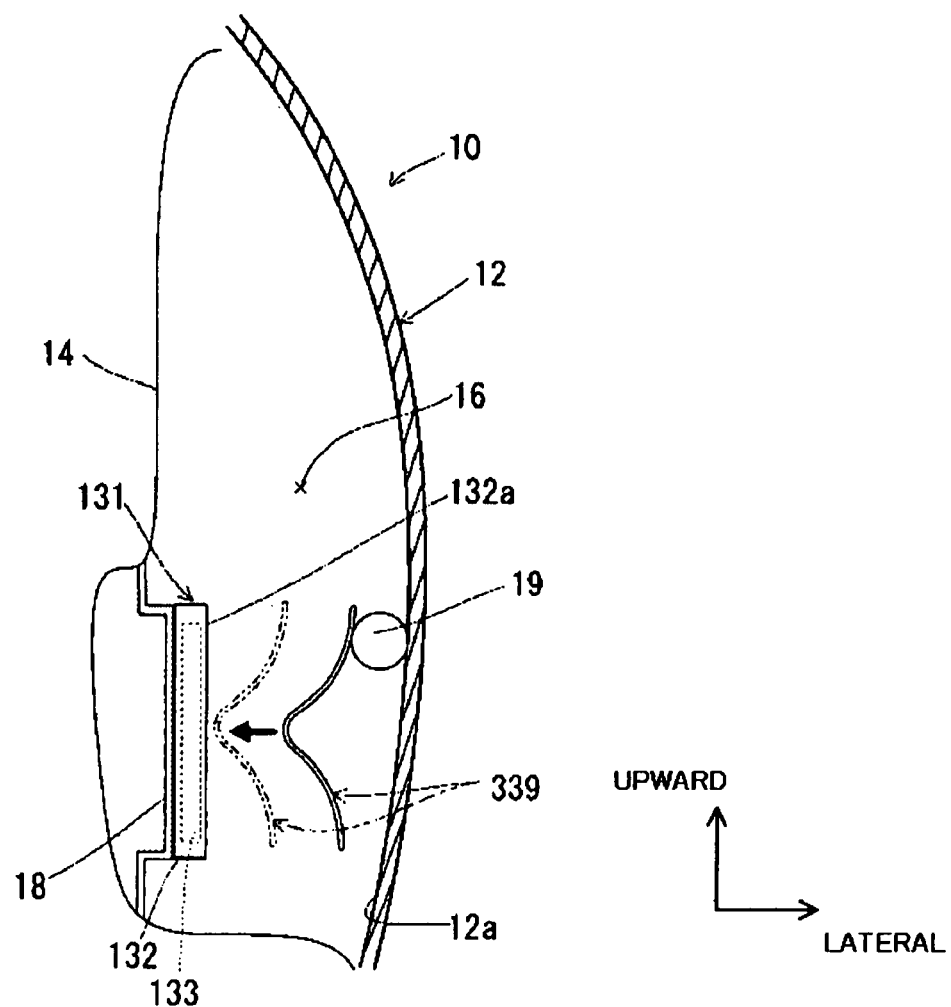
FIG. 11 is an illustration showing an arrangement using a metal plate.

Though the aforementioned embodiments have been described with regard to a case that, as the object to be detected by the coil sensor 131, the extending surface arranged to face the sensor surface of the coil sensor 131 is a flat surface, the extending surface arranged to face the sensor surface of the coil sensor 131 may be configured as a surface other than the flat surface, for example, a curved surface and a stepped surface. FIG. 10 and FIG. 11 each show an arrangement using a metal plate of another embodiment.

A metal plate 239 shown in FIG. 10 has a circular truncated cone shape of which center portion projects toward the coil sensor 131 and is held on the sensor surface 132a of the sensor housing 132 via the holding member 131. That is, the metal plate 239 has a convex as the extending surface arranged to face the sensor surface of the coil sensor 131. The metal plate 239 may correspond to the metallic object to be detected. With this arrangement, in the event of a lateral collision of the subject vehicle 200, the door outer panel 12 and the metal plate 239 are integrally displaced toward the coil sensor 131 (the coil 133) by the pressing force from the door outer panel 12. The metal plate 239 is displaced, for example, from a position shown by solid lines to a position shown by two-dot chain lines in FIG. 10 so as to flatten the holding member 134. Information about this displacement of the metal plate 239 is derived by the control unit 120. With regard to the shape of the metal plate 239 shown in FIG. 10, the shape of the metal plate 239 may be another shape other than the circular truncated cone shape, such as a cylindrical shape, a rectangular truncated cone shape, an arc shape, and a shape with steps.

A metal plate 339 shown in FIG. 11 is structured as a curved plate of which center portion projects toward the coil sensor 131 and which is held on the door beam 19 on the door outer panel 12 side. That is, the metal plate 339 has a curved surface as the extending surface arranged to face the sensor surface of the coil sensor 131. The metal plate 339 may correspond to the object to be detected. With this arrangement, in the event of a lateral collision of the subject vehicle 200, the door outer panel 12 and the metal plate 339 are integrally displaced toward the coil sensor 131 (the coil 133) by the pressing force from the door outer panel 12. The metal plate 339 is displaced, for example, from a position shown by solid lines to a position shown by two-dot chain lines in FIG. 11. Information about this displacement of the metal plate 339 is derived by the control unit 120.

By using a member having a curved surface like the metal plate 339 shown in FIG. 11 as the object to be detected by the coil sensor 131, further effect relating to the detecting characteristics of the metal plate can be obtained. Though the detection characteristics which are linearized to have substantially constant variation in AC impedance relative to the distance between the metal plate and the detecting sections are obtained even in a case using a metal plate having a flat surface, the metal plate having a curved surface enables increase the linearization of the variation in AC impedance. Hereinafter, respective works and effects of a case using a metal plate having a flat surface (hereinafter, called flat plate), of a case using a metal plate having a curved surface (hereinafter, called curved plate A), and of a case using a metal plate having a curved surface of which curvature is different from that of the curved plate A (hereinafter, called curved plate B) will be specifically described with reference to FIG. 12 through FIG. 15.

Figure 12:
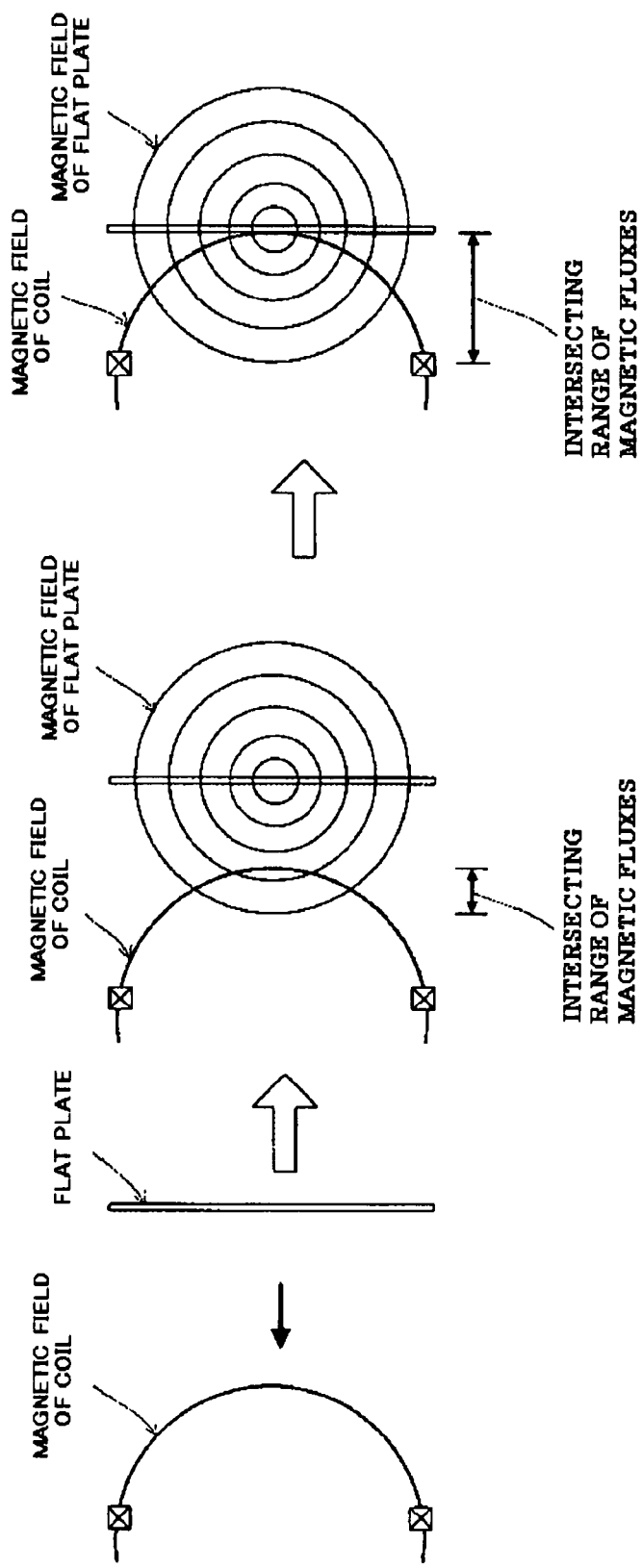
FIG. 12 is an illustration showing a state that a flat plate is brought closer to a coil in the order of distance d between the flat plate and the coil=d1, d2 (<d1), and d3 (<d2).
Figure 13:
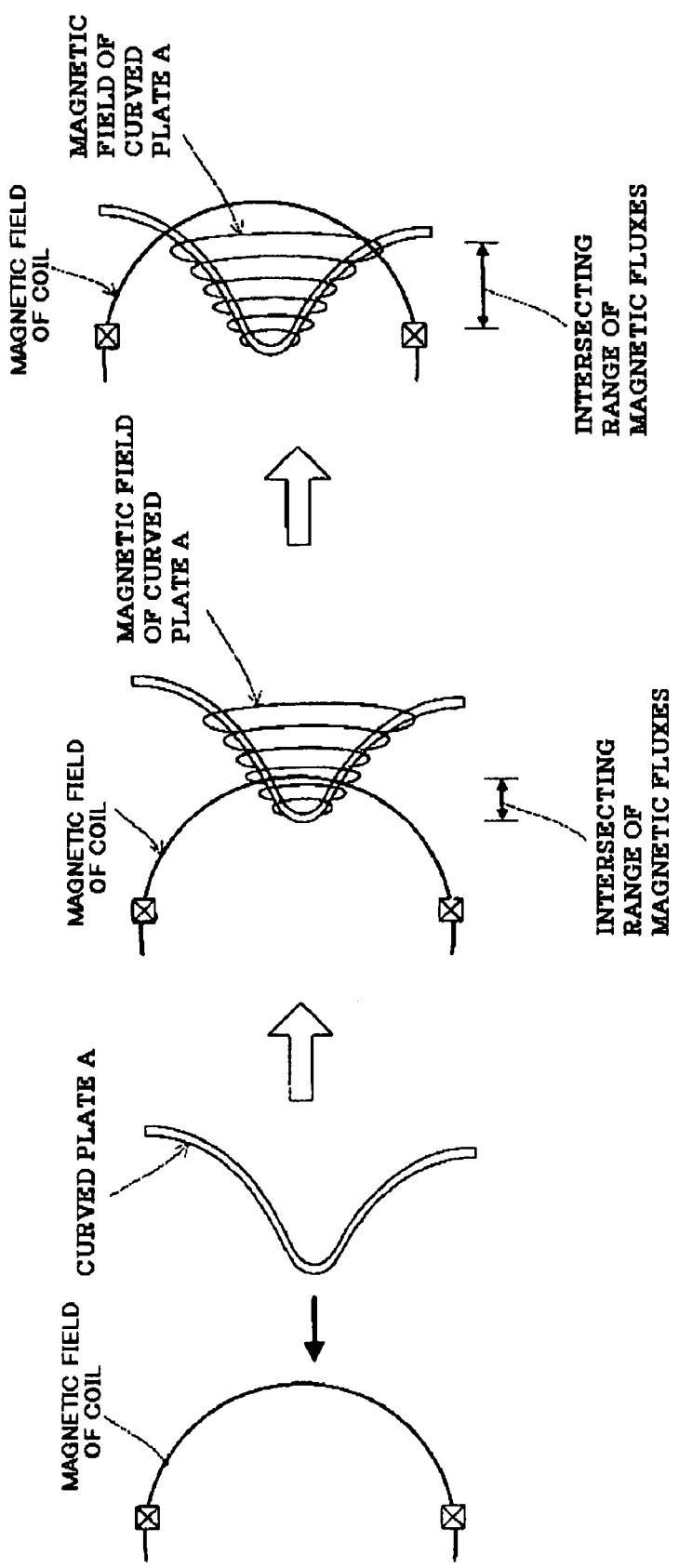
FIG. 13 is an illustration showing a state that a curved plate A is brought closer to the coil in the order of distance d between the curved plate A and the coil=d1, d2 (<d1), and d3 (<d2).

FIG. 12 shows a state that the flat plate is brought closer to the coil in the order of distance d between the flat plate and the coil=d1, d2 (<d1), and d3 (<d2). FIG. 13 shows a state that the curved plate A is brought closer to the coil in the order of distance d between the curved plate A and the coil=d1, d2 (<d1), and d3 (<d2). FIG. 4 shows a state that the curved plate B is brought closer to the coil in the order of distance d between the curved plate B and the coil=d1, d2 (<d1), and d3 (<d2).

Figure 14:
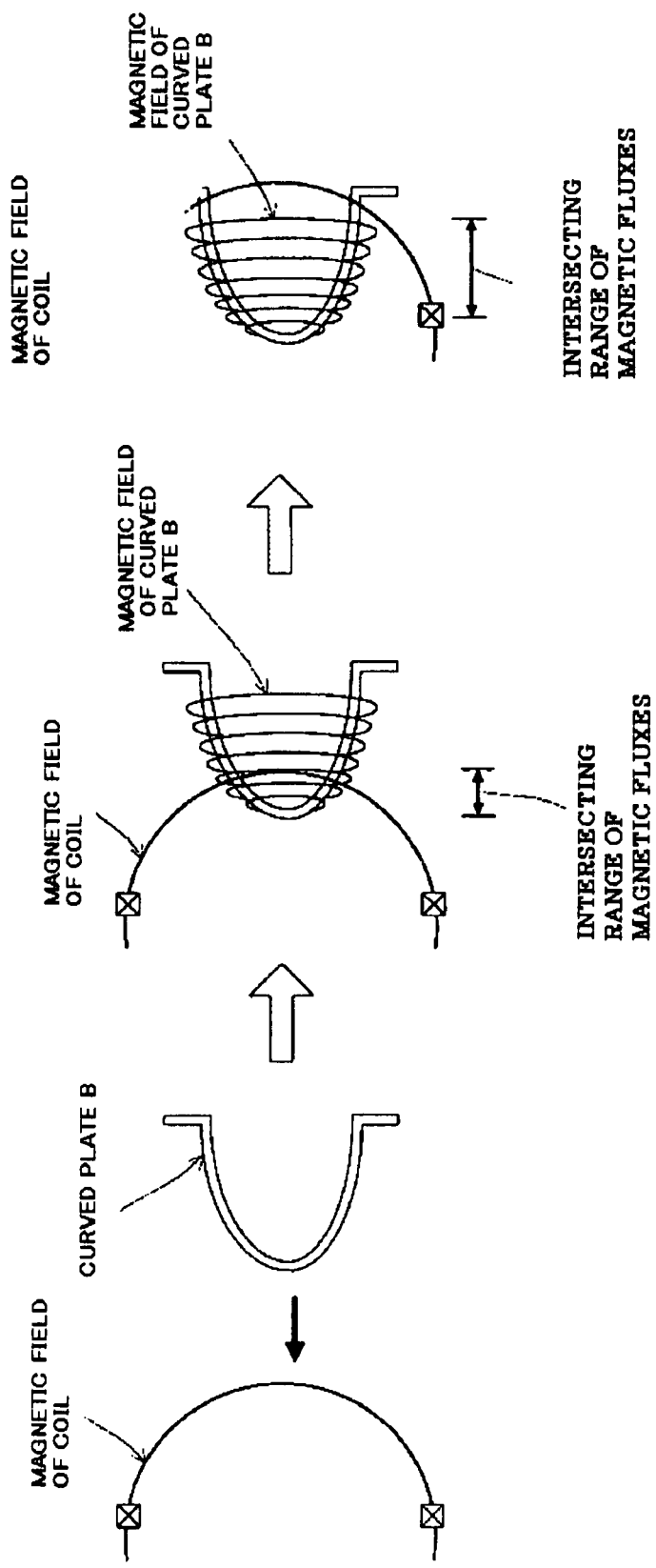
FIG. 14 is an illustration showing a state that a curved plate B having a curved surface of which curvature is smaller than that of the curved plate A shown in FIG. 13 is brought closer to the coil in the order of distance d between the curved plate B and the coil=d1, d2 (<d1), and d3 (<d2).
Figure 15:
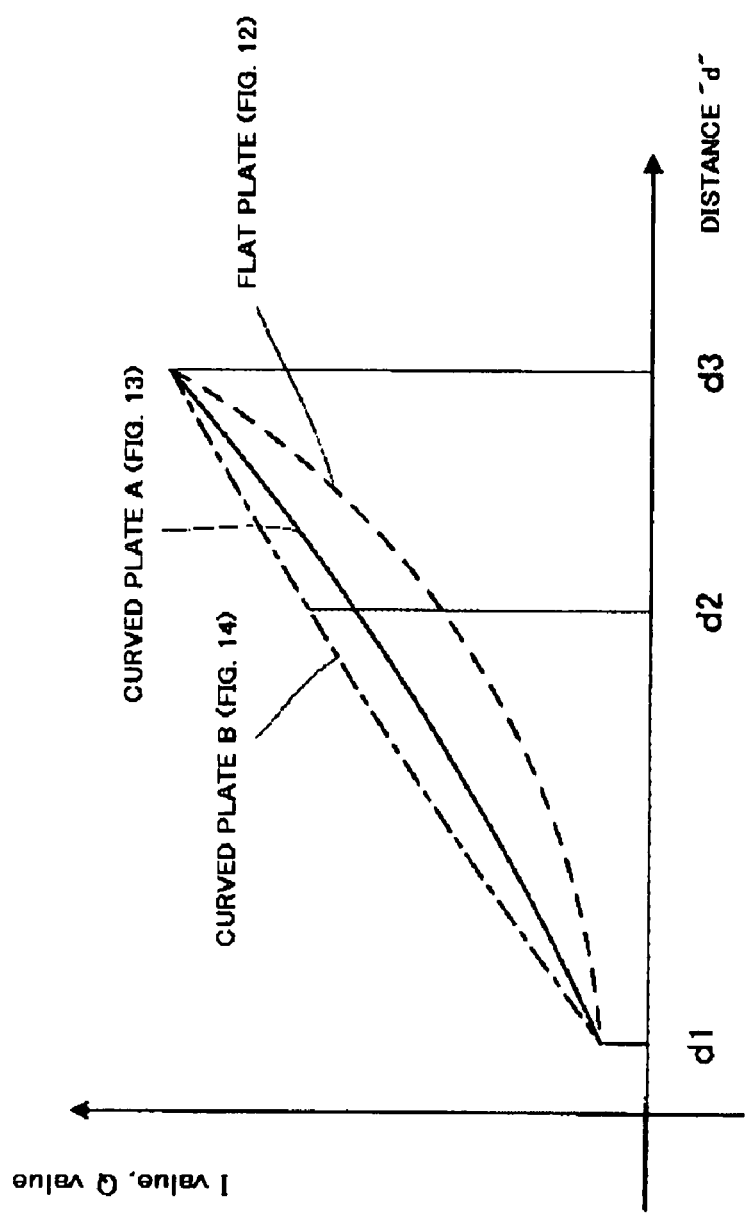
FIG. 15 is a graph showing relations of Q values and I values relative to the distance d between the metal plate and the coil in the respective cases using the flat plate, the curved plate A, and the curved plate B.

By comparing FIG. 12 through FIG. 14, it should be found that there are differences, depending on the shape of the metal plate, in intersecting range (range with high magnetic flux density) of magnetic fluxes between the metal plate and the coil during the process that the metal plate becomes closer to the coil. Specifically, in case of the flat plate, as the distance relative to the coil is reduced, the intersecting range of the magnetic flux is rapidly increased so as to rapidly increase the AC impedance. On the other hand, in case of the curved plate A and the curved plate B, at a position with the distance d=d3, the tip of the metal plate is positioned apart from the region where is influenced by the magnetic field of the coil. Therefore, in a range from a position with the distance d2 to the position with the distance d3, the increase in AC impedance is gentle as compared to the case of the flat plate, thereby improving the linearization of the variation in AC impedance. For example, in case of the flat plate, the increasing ratio of AC impedance at the position with the distance d3 is larger than that at the position with the distance d2. On the other hand, in case of the curved plate A and the curved plate B, the increasing ratio of AC impedance at the position with the distance d3 is substantially the same as that at the position with the distance d2. In case of using a curved plate, the variation form of AC impedance can be adjusted by selecting a curved plate having a curved surface of a suitable curvature. These results can be seen in FIG. 15 showing variations in Q value and I values according to the distance between the metal plate and the coil in respective cases of using the flat plate, the curved plate A, and the curved plate B. The Q value used here is defined as a value reflecting the phase relation of the current and voltage flowing through the coil and the I value used here is defined as a value reflecting amplitude information during detection.

Though the aforementioned embodiment has been described with regard to the collision detecting device 130 adapted for a technology for detecting occurrence of a lateral collision, in the present invention the arrangement of the collision detecting device 130 may be adapted for a technology for detecting occurrence of collision of various types. In this case, the installation location of the coil sensor 131 which is mounted in the vehicle door 10 may be changed according to the type of the vehicle collision.

Though the aforementioned embodiment has been described with regard to a case that the information about displacement of the door outer panel 12 is used for controlling the airbag module 110 which operates for restraining the vehicle occupant in the event of a vehicle collision, the information about displacement of the door outer panel 12 may be used for controlling an occupant restraint device such as a seat belt device and a warning device for outputting warning such as display and sound.

Though the aforementioned embodiment has been described with regard to the collision detecting device 130 for detecting a lateral collision of a vehicle, the arrangement may be adopted to a technology for detecting a vehicle collision other than the side collision, such as a frontal collision (full-wrap collision, offset collision, pole frontal collision, oblique collision), a rear collision, and a rollover.

Though the aforementioned embodiment has been described with regard to the arrangement of the vehicle occupant restraint system to be installed in an automobile, the present invention can be adopted to occupant restraint systems to be installed in various vehicles such as an automobile, an airplane, a boat, a train, a bus, a truck, and the like.

What is claimed is:

1. A displacement information deriving device comprising:
   a metallic object to be detected which is structured as a vehicle component;
   a coil arranged to face the object to be detected;
   a coil sensor which applies an AC magnetic field to the object to be detected when the coil is energized with alternative current and which detects impedance through the coil when energized; and
   a deriving unit for deriving information about displacement of the object to be detected based on variations in impedance detected when the object to be detected is displaced toward the coil sensor in the event of a vehicle collision,
   wherein the object to be detected is displaced toward the coil sensor according to the displacement of the vehicle component by the vehicle collision and the object to be detected has an extending surface arranged to face the sensor surface of the coil sensor, and
   wherein the object to be detected is fixed to the coil sensor via an elastically deformable elastic body between the vehicle component and the coil sensor, and the object to be detected is pressed by the vehicle component according to the displacement of the vehicle component toward the coil sensor to move closer to the coil against the elastic force of the elastic body during the vehicle collision.

2. A displacement information deriving device as claimed in claim 1, wherein the elastic body is elastically deformed maintaining the parallel relation between the extending surface of the object to be detected and the sensor surface of the coil sensor when the object to be detected is moved closer to the coil sensor.

* * * * *